United States Patent
Romm et al.

(10) Patent No.: US 9,940,220 B2
(45) Date of Patent: Apr. 10, 2018

(54) INTEGRATING A PROTOCOL ANALYSIS DEVICE WITH FEATURES OF A SOFTWARE DEVELOPMENT PROGRAM

(71) Applicant: Teledyne LeCroy, Inc., Thousand Oaks, CA (US)

(72) Inventors: Michael Romm, Los Altos, CA (US); Douglas Lee, San Jose, CA (US); Evgeni Stavinov, San Jose, CA (US); Daniel Jacobs, San Jose, CA (US); Christopher Webb, Campbell, CA (US)

(73) Assignee: Teledyne LeCroy, Inc., Thousand Oaks, CA (US)

( * ) Notice: Subject to any disclaimer, the term of this patent is extended or adjusted under 35 U.S.C. 154(b) by 1 day.

(21) Appl. No.: 15/097,459

(22) Filed: Apr. 13, 2016

(65) Prior Publication Data

US 2016/0321159 A1 Nov. 3, 2016

Related U.S. Application Data

(60) Provisional application No. 62/155,547, filed on May 1, 2015.

(51) Int. Cl.
*G06F 9/44* (2006.01)
*G06F 11/36* (2006.01)
*G06F 3/0484* (2013.01)

(52) U.S. Cl.
CPC ........ *G06F 11/364* (2013.01); *G06F 3/04842* (2013.01); *G06F 11/3636* (2013.01)

(58) Field of Classification Search
CPC . G06F 11/364; G06F 11/3636; G06F 3/04842
(Continued)

(56) References Cited

U.S. PATENT DOCUMENTS 8,745,537 B1 * 6/2014 Shakeri ................. G06F 11/323
 715/734
9,495,378 B2 * 11/2016 Sundaram ........... G06F 11/3636
(Continued)

OTHER PUBLICATIONS

"Integrated development environment", Retrieved from Wikipedia: "https://en.wikipedia.org/w/index.php?title=Integrated_development_environment&oldid=606591360", (May 1, 2014), 1-5.
(Continued)

*Primary Examiner* — Anna Deng
(74) *Attorney, Agent, or Firm* — Andrew Dommer

(57) ABSTRACT

In general, the subject matter described in this disclosure can be embodied in methods, systems, and program products for controlling a protocol analysis device when a code execution breakpoint is encountered. The method includes displaying computer code in a user interface of a software development program. The computer code includes a breakpoint. The computing system receives user input to cause a first hardware device to execute the computer code. The computing system instructs the first hardware device to execute the computer code. The computing system instructs a protocol analysis device that is in communication with the computing system to begin recording data that is transmitted between the first hardware device and a second hardware device. The computing system determines that execution of the computer code has reached the breakpoint and as a result instructs the protocol analysis device to start or stop recording the data.

22 Claims, 9 Drawing Sheets

FIG. 6B

(58) Field of Classification Search
USPC .......................................................... 717/125
See application file for complete search history.

(56) References Cited

U.S. PATENT DOCUMENTS

2007/0276692 A1* 11/2007 Mei .................... G06F 11/3664
717/125
2011/0307871 A1* 12/2011 Branda ............... G06F 11/3664
717/129

OTHER PUBLICATIONS

"Plug-in (computing)", Retrieved from Wikipedia: "https://en.wikipedia.org/w/index.php?title=Plug-in_(computing)&oldid=588696997", (Jan. 1, 2014), 1-6.
"Protocol analyzer", Retrieved from Wikipedia: "https://en.wikipedia.org/w/index.php?title=Protocol_analyzer&oldid=537648554", (Feb. 1, 2013), 1.
"Bus analyzer", Retrieved from Wikipedia: "https://en.wikipedia.org/w/index.php?title=Bus_analyzer&oldid=478054080", (Feb. 21, 2012), 1-2.
"Instrumentation", Retrieved from Wikipedia: "https://en.wikipedia.org/w/index.php?title=Instrumentation&oldid=626643725", (Sep. 22, 2014), 1-7.

* cited by examiner

INTEGRATING A PROTOCOL ANALYSIS DEVICE WITH FEATURES OF A SOFTWARE DEVELOPMENT PROGRAM

CROSS REFERENCE TO RELATED APPLICATIONS

This application claims the benefit under 35 USC § 119 to U.S. Provisional Patent Application Ser. No. 62/155,547, filed May 1, 2015, titled "Enhancing Software Debug Capabilities by Integration of Software Integrated Development Environment with Protocol Analysis Tools," currently pending, the contents thereof being incorporated herein by reference.

FIELD OF TECHNOLOGY

This application is related generally to integrating a protocol analysis device with features of a software development program.

BACKGROUND OF THE INVENTION

In the field of software development, developers use an Integrated Development Environment (IDE), which is a collection of software programs including, but not limited to, a code editor, a code syntax checker, a code compiler, a runtime debugger, a program output console, a variables viewer, a memory viewer, a stack viewer, and a register viewer. The IDE provides a single integrated environment in which the software developer can write code, compile and build code for the target platform, run the code, and debug the code.

Some software developers work in software layers that deal with interface controller subsystems that adhere to certain communication protocols. Examples of such subsystems are storage, memory, human interface, multimedia, and networking software layers. When working in such software layers, the software developer is typically engaged in activities that involve debugging both functional and non-functional aspects of system behavior. Whether the developer needs to debug the interface controller behavior itself, how a program uses said interface controller, or how a program interacts with another entity connected to said interface controller, the developer can employ one or more protocol analysis tools to gain insight into how each of these entities interacts with each other.

Protocol analysis devices, such as protocol analyzers and protocol exercisers, are used to debug and test the functionality of various communication channels that allow components and sub-systems to exchange commands and data. Over the years, both the underlying PHY-layers and the protocols have evolved to maximize the performance of the hardware system, in throughput, power consumption, footprint and communication range. The use of protocol analysis devices, however, remained more or less the same—analyzing protocol information (e.g., digital data commands and data) transmitted between hardware interfaces, either using the protocol analysis device as a standalone device or as part of a more elaborate setup integrating several devices. For protocol analyzers which capture data being communicated along a communication channel, the "capture session" may be initiated by a user, by identifying an occurrence in the transmitted information (a "trigger event") that triggers the device to start capture, or by external devices through pre-defined application programming interfaces (APIs). For protocol exercisers, which supply data to a device through a communication channel, the "exercising session" in these setups may be initiated by a user, by user-generated scripts, trigger events in the received information, or through pre-defined APIs.

SUMMARY

The proliferation of mobile and portable systems, like in the case of Internet of Things (IoT) products, in addition to the continuous quest for higher-performance computing and storage servers that are the backbone of Cloud Computing, require the modern software and firmware engineers to debug mixed hardware-software complex systems that include multiple internal and external communication channels and protocols.

In order to debug such systems, a software developer's progress is often impeded by having to switch back and forth between multiple non-integrated tools and by those tools not communicating and functioning together. In recent years the line between personal computer software and embedded software (also called firmware) is blurring while end-users and customers demand more software to run on their mobile devices. For many engineers developing applications, the development tools and environment have been limited to software tools, code editors, compilers, and device emulators, which may use very little or no additional hardware. However, some engineers need to test how their software functions and interacts with hardware sub-systems and devices. For these engineers, it can be helpful to use tools that provide visibility into the hardware domain and into hardware interfaces that allow multiple hardware sub-systems in a given system to communicate, interact, and provide the desired experience to the end-user.

Engineers have different preferences for debug tools, which match the target system architecture and the application being developed, at least partially based on their experience and expertise. Oscilloscopes, logic analyzers, and software IDE programs are some of the tools used. Additionally, the footprint of software has been growing in the modern embedded systems, taking on functionality that would traditionally have been implemented in hardware.

Therefore, this disclosure describes an integration of two debugging and test tools in a manner that streamlines the debugging process and reduces engineering effort. Thus, the present invention proposes combining certain features of software debuggers (which, for example, provide breakpoints, step through execution of code line-by-line, provide variable/register inspection, call stack navigation, and perform memory inspection) and protocol bus analysis tools (which, for example, provide accurate timing, record full data transmitted on the bus, offer a "neutral" perspective, provide real-time triggering/filtering of event, and also potentially provide protocol exercising). In such an integration, the protocol analysis tool works in tandem with the IDE, so that the protocol analysis tool can capture or exercise bus traffic in intervals that begin and/or end according to events in the code.

As additional description to the embodiments described below, the present disclosure describes the following embodiments.

Embodiment 1 is a method for controlling a protocol analysis device when a code execution breakpoint is encountered. The method comprises displaying, by a computing system, at least a portion of computer code in a user interface of a software development program, wherein the computer code includes a user-specified breakpoint at which execution of the computer code is to stop when the computer code is executed. The method comprises receiving, by the computing system, user input to cause a first hardware device to execute the computer code that is presented by the user interface of the software development program. The method comprises instructing, by the computing system, the first hardware device to execute the computer code that is presented by the user interface of the software development program. The method comprises instructing, by the computing system, a protocol analysis device that is in communication with the computing system to begin recording data that is transmitted between the first hardware device and a second hardware device during execution of the computer code by the first hardware device. The method comprises determining, by the computing system, that execution of the computer code has reached the breakpoint and as a result instructing, by the computing system, the protocol analysis device to start or stop recording the data that is transmitted between the first hardware device and the second hardware device without the computing system having received user input after determining that execution of the computer code has reached the breakpoint.

Embodiment 2 is the computer-implemented method of claim 1. The method further comprises determining, by the computing system, that execution of the computer code has reached another breakpoint, wherein the computing system instructing the protocol analysis device to begin recording data that is transmitted between the first hardware device and the second hardware device is performed by the computing system without receipt of user input after determining that the execution of the computer code has reached the another breakpoint.

Embodiment 3 is the computer-implemented method of claim 1, wherein the computing system instructs the protocol analysis device to stop recording the data as a result of the computing system having determined that execution of the computer code has reached the breakpoint.

Embodiment 4 is the computer-implemented method of claim 1, further comprising causing, by the computing system and as a result of having determined that the execution of the computer code has reached the breakpoint, the first hardware device to stop executing the computer code.

Embodiment 5 is the computer-implemented method of claim 1, further comprising receiving, by the computing system and as a result of having determined that the execution of the computer code has reached the breakpoint, a trace file that identifies the data that the protocol analysis device recorded during the execution of the computer code by the first hardware device.

Embodiment 6 is the computer-implemented method of claim 1. The method further comprises determining, by the computing system, that execution of the computer code has reached another breakpoint and as a result instructing, by the computing system, the protocol analysis device to insert a marker into a recording of the data that is transmitted between the first hardware device and the second hardware device. The method further comprises displaying, by the computing system and within a user interface of the software development program, at least a portion of the recording of the data that is transmitted between the first hardware device and the second hardware device, with the displayed at least portion including the marker that was inserted into the recording of the data that was transmitted between the first hardware device and the second hardware device.

Embodiment 7 is the computer-implemented method of claim 1. The method further comprises receiving, by the computing system, user input that interacts with the user interface of the software development program to insert a marker into the computer code. The method further comprises providing, by the computing system and for receipt by the first hardware device, the computer code with the marker included therein. The method further comprises displaying, by the computing system and in the user interface of the software development program, a trace of the data that was transmitted between the first hardware device and the second hardware device and that was recorded by the protocol analysis device, with the displayed data including the marker.

Embodiment 8 is the computer-implemented method of claim 1. The method further comprises receiving, by the computing system and from the protocol analysis device, a trace of the data that was transmitted between the first hardware device and the second hardware device and that was recorded by the protocol analysis device. The method further comprises displaying, by the computing system and in the user interface of the software development program, the trace of the data that was transmitted between the first hardware device and the second hardware device and that was recorded by the protocol analysis device. The method further comprises receiving, by the computing system and in the user interface of the software development program, user input that changes the user interface of the software development program from displaying a first portion of the computer code to presenting a second portion of the computer code, and as a result changing, by the computing system, the user interface from displaying a first portion of the trace to displaying a second portion of the trace, wherein the first portion of the trace includes data that was transmitted between the first hardware device and the second hardware device as a result of execution by the first computing device of the first portion of code, wherein the second portion of the trace includes data that was transmitted between the first hardware device and the second hardware device as a result of execution by the first computing device of the second portion of code.

Embodiment 9 is the computer-implemented method of claim 1, further comprising regularly updating, by the computing system and while the computer code is executing on the first hardware device, the user interface of the software development program to indicate the portion of the computer code that the first hardware device is executing at that time, by regularly changing the portion of the computer code that is presented by the user interface of the software development program.

Embodiment 10 is the computer-implemented method of claim 1, wherein the execution of the computer code by the first hardware device is controlled by the software development program such that user input interacting with the software development program is able to start execution of the computer code by the first hardware device and stop execution of the computer code by the first hardware device.

Embodiment 11 is directed to a system that includes one or more processors and one or more computer-readable devices having instructions stored thereon, that when executed by the one or more processors, cause the performance of actions according to the method of any one of embodiments 1 through 10.

Embodiment 12 is directed to a computer-implemented method for stopping execution of computer code when a protocol analysis device triggers. The method comprises displaying, by a computing system, at least a portion of computer code in a user interface of a software development application program. The method comprises receiving, by the computing system, user input to cause a first hardware device to execute the computer code that is presented by the user interface of the software development application. The method comprises instructing, by the computing system, the first hardware device to execute the computer code. The method comprises determining, by the computing system, that a protocol analysis device, which is recording data that is transmitted between the first hardware device and the second hardware device during execution of the computer code by the first hardware device, has encountered a trigger, wherein execution of the computer code at the first hardware device is stopped after protocol analysis device has encountered the trigger. The method comprises indicating, by the computing system and in the user interface of the software development application program, a portion of the computer code at which the first hardware device stopped executing in response to the protocol analysis device encountering the trigger.

Embodiment 13 is the computer-implemented method of claim 12, further comprising sending, by the computing system as a result of the computing system having determined that the protocol analysis device has encountered the trigger, a signal to the first hardware device to cause the first hardware device to stop executing the computer code.

Embodiment 14 is the computer-implemented method of claim 12, wherein the protocol analysis device encountering the trigger includes the protocol analysis device encountering the trigger in the data that is transmitted between the first hardware device and the second hardware device, wherein the trigger includes a data element of a particular value or a collection of data elements of a particular sequence of values.

Embodiment 15 is the computer-implemented method of claim 14, further comprising receiving, by the computing system, user input that interacts with a user interface of the computing system to specify the trigger.

Embodiment 16 is the computer-implemented method of claim 15, further comprising sending, by the computing system for receipt by the protocol analysis device as a result of the computing system having received the user input that specifies the trigger, an instruction that identifies the trigger and that indicates that the protocol analysis device is to perform a predefined action upon encountering the trigger in the data that is transmitted between the first hardware device and the second hardware device.

Embodiment 17 is the computer-implemented method of claim 12, wherein the protocol analysis device encountering the trigger includes the protocol analysis device receiving, at a trigger input of the protocol analyzer, a signal that was sent by the first hardware device.

Embodiment 18 is the computer-implemented method of claim 12, wherein the computing system determining that the protocol analysis device has encountered the trigger includes the computing system receiving a notification that was generated by the protocol analysis device and that indicates that the protocol analysis device has encountered the trigger.

Embodiment 19 is the computer-implemented method of claim 12, wherein the computing system determines that the protocol analysis device has encountered the trigger in the data as a result of the protocol analysis device notifying the first hardware device that the protocol analysis device has encountered the trigger, and the first hardware device sending a responsive notification to the computing system.

Embodiment 20 is the computer-implemented method of claim 12, wherein the execution of the computer code by the first hardware device is controlled by the software development application program, such that user input interacting with the software development application program is able to start execution of the computer code by the first hardware device and stop execution of the computer code by the first hardware device.

Embodiment 21 is the computer-implemented method of claim 12. The method further comprises receiving, by the computing system and from the protocol analysis device, a trace of the data that was transmitted between the first hardware device and the second hardware device and that was recorded by the protocol analysis device. The method further comprises displaying, by the computing system and in the user interface of the software development program, the trace of the data that was transmitted between the first hardware device and the second hardware device and that was recorded by the protocol analysis device. The method further comprises receiving, by the computing system and in the user interface of the software development program, user input that changes the user interface of the software development program from displaying a first portion of the computer code to presenting a second portion of the computer code, and as a result changing, by the computing system, the user interface from displaying a first portion of the trace to displaying a second portion of the trace, wherein the first portion of the trace includes data that was transmitted between the first hardware device and the second hardware device as a result of execution by the first computing device of the first portion of code, wherein the second portion of the trace includes data that was transmitted between the first hardware device and the second hardware device as a result of execution by the first computing device of the second portion of code.

Embodiment 22 is directed to a system that includes one or more processors and one or more computer-readable devices having instructions stored thereon, that when executed by the one or more processors, cause the performance of actions according to the method of any one of embodiments 12 through 22.

BRIEF DESCRIPTION OF THE DRAWINGS

For a more complete understanding of the technology described in this disclosure, reference is made to the following description and accompanying drawings, in which.

DETAILED DESCRIPTION

Figure 1:
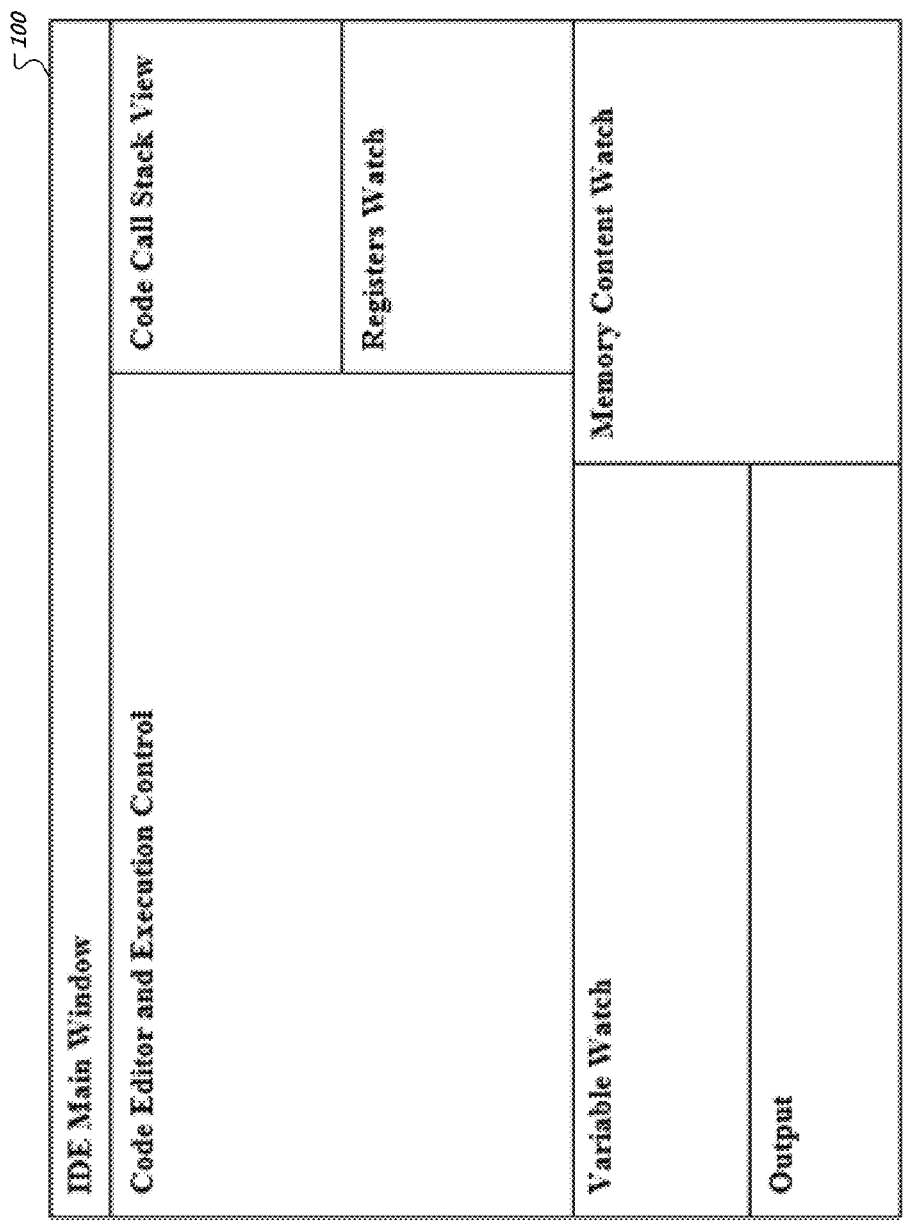
FIG. 1 is a generalized display of a typical existing software integrated development environment.

This disclosure generally relates to various techniques for integrating features of software development programs with features of protocol analyzers to enhance the functioning of one or both systems. Doing so may enable a developer to stop execution of code that is being created and tested within the software development program when the protocol analyzer identifies a particular triggering event. The developer may also be able to stop execution of the protocol analyzer when the software development program encounters a breakpoint.

Generalizing software development, programs are commonly written using high-level programming languages, low-level programming languages, or a combination of both. The program is usually written for specific "Target" computing systems, to implement functionality specified by the end-product requirements. For this the program is translated, by compilation or interpretation to a machine language program so that the Target computing system can process and execute it. The software development tools commonly allow the software developer to have full control over the execution of a program on the target system, including initiating the execution, pausing its execution at pre-determined locations in the program (using Breakpoints), checking the internal status of the program and components within that program, and halting the program. This control over the program allows the developer to check and test for the desired behavior of the program. Modern software development tools are usually grouped in a program, commonly referred to as the Integrated Design Environment ("IDE"), which helps streamline the software development effort. Such programs are regularly presented with a windowing-based visual user interface.

With a software development program, a developer may be able to type code into a program editor window of the program (e.g., a resizable portion of the user interface of the software development program, which may be scrollable and which may be movable within the user interface). The software development program may present the typed code differently than how a typical text editor presents typed information. For example, software development program may identify certain functions or portions of the typed code, and may treat the identified functions or portions in different ways (e.g., by automatically coloring certain portions of code in different manners, and by automatically structuring the code in predefined manners, for example, by indenting certain functions or portions of the code). The developer may be able to execute code that has been typed or otherwise loaded into the software development program, for example, as a simulation or by sending the code to a Target system (e.g., a remote device such as a mobile phone running a mobile phone operating system) and running the code on that device.

The software development program may provide advantages over simply typing code and then running it on the target system. For example, the software development program may indicate that certain portions of code contain errors. The software development program may allow a user to start execution of code, and then stop or pause the execution of the code at user-defined times (e.g., by pressing a stop or pause button). During the execution of the code, and at any stop or pause in the execution of the code, the software development program may indicate the present values of certain memory locations or registers of the target system. Moreover, the developer may cause the code to execute (either in the simulation or on the target system) a single line of code at a time, thereby providing the developer with a step-by-step view into how the code affects memory and register values, and in some instances, into the physically-visible operation of the target system (e.g., by lights that the target system turns on or off).

The target system may sometimes be configured to communicate with one or more other devices. In one example, the target system may be a mobile device such as a phone or a tablet that is in communication with a peripheral device, such as a camera or an external hard drive that is connected to the target system over a cable. The software development program may be unable to identify what information is being transmitted from the mobile device to its peripheral device, and thus, the developer may not be able to easily identify how the execution of the code by the mobile device affects the data that is transmitted to the peripheral device. One way to view the transmitted data is to connect a protocol analysis device between the mobile device and the peripheral device.

A protocol analysis device (e.g., a protocol analysis tool) may be a device or system that is able to intercept and log traffic that passes over a communication channel. The device may decode the content of packets transmitted over the communication channel and show the values of various fields in various packets on a display. One challenge for a user of protocol analysis devices is to find the right timing to initiate the logging of communication traffic in the right moment, so the communication events would be captured and analyzed within the capture time window. For this, protocol analysis tools usually have an elaborate capture trigger mechanism that allows the users to preset the tool for a timely capture.

Furthermore, it is challenging to log the communication traffic so it can be correlated with a particular portion of code that is being executed under the control of the software development program, and vice versa, to allow the software developer to examine the interaction between the software and protocol interfaces used on the target system.

The technology described in this application can integrate these separate technologies. For example, the protocol analysis device can be connected to a separate computing system at which the software development program is operating, and can send to the software development program a trace of data that the protocol analysis device recorded. The software development program may present the trace of data in a window that is separate from a window in which the software development program presents the code (but both windows may be portions of the window or user interface for the software development program, which itself may be resizable and minimizable. A user may be able to scroll through the code and select an instruction or line of code, and the software development program may update the window that shows the trace of data from the protocol analysis device to show the data that was transmitted over the communication channel at a time that corresponds to execution of the selected instruction or line of code. The software development program may also update other windows to show the values of registers at that moment in time.

Moreover, a user may be able to instruct the software development program to stop executing the code when the protocol analysis device encounters a particular trigger. For example, the software development program may include user interface elements (e.g., a text entry field or a pull down menu) with which a user may specify a data item or a sequence of data items on which the protocol analysis device should trigger. As such, when the target system is executing the code and transmitting data over the communication channel, the protocol analysis device may monitor the transmitted data to identify the occurrence of a data item or a sequence of data items in the transmitted data. In response to identifying such an occurrence, the protocol analysis device may send to the computing system that hosts the software development program a signal that indicates that the protocol analysis device encountered the data element or sequence of data elements. In some examples, the protocol analysis device may stop recording upon identifying the data element or sequence of data elements in the communication path. The signal transmitted from the protocol analysis device to the computing system may be a digital or analog value or set of values that is output at a port of the signal analysis device and that is received at a port of the computing system.

In response to the computing system receiving the transmitted signal, the software development program may halt execution of the computer code, which may include instructing the target system to stop executing the code and therefore to stop transmitting data over the communication channel. In response to the protocol analysis device identifying the data element or sequence of data elements in the communication channel, the protocol analysis device may transfer the captured data that identifies all, or select portions of data (e.g., all portions of the transmitted data of a certain type) that the protocol analysis device recorded since the target system began executing the computer code or since the protocol analysis device received user input indicating that the protocol analysis device was to begin recording or monitoring transmitted data. As such, the software development program, with execution of the computer code stopped, may indicate the line of code at which the computer code was stopped, may display the data recorded by the protocol analysis device, including an indication of a most-recently recorded data item, and may display the current values of registers and certain memory locations.

In another example, a developer may request that the software development program stop execution of the code at a pre-set location. This location may be a breakpoint, which can be an intentional stopping place in a computer program that a developer can place into the code for debugging purposes. The breakpoint may be inserted into the computer code by the developer, and may cause the software development program to stop or pause execution of the code when the breakpoint is encountered (stopping both the updating of the display of the code by the software development program and the actual operation of the code on the target system).

At that time, the software development program may display the current registers and values in portions of memory. It is possible, however, that the protocol analysis device may not have uploaded its recorded data to the software development program for user review, for example, because the protocol analysis device may store data until it is instructed to transmit that data to another device, or because the target system or sub portions thereof may continue to execute and transmit data over the communication channel even though the execution of the code that is controlled by the software development program may have been stopped. As such, the software development program and the computing system can be configured to send a signal to the protocol analysis device upon identifying that a breakpoint was encountered. The signal to the protocol analysis device may cause the protocol analysis device to stop recording and to send its recorded data to the computing system for display by the software analysis program (e.g., where the recorded data includes a batch transmission of all data recorded since the protocol analysis device most-recently began recording data, and the protocol analysis device may not have previously transmitted data to the computing system since it most-recently began recording data).

There are various other mechanisms by which a software development program and a protocol analysis device may integrate, and which are described throughout this disclosure. For example, the following paragraphs provide some background of the debugging process and various aspects of the technology described herein.

In a simplified example of system debugging, one can find two main types of activities that relate to protocols. First is system debugging that involves communicating on internal or peripheral busses of the system, and which relates to functionality and performance when the interface controller might not behave correctly. Second is software debugging which relates to communication interfaces, in which it may be assumed that the interface controller is fully functional. This second activity may focus on the debugging of the application and less or not on debugging the protocol. The debugging may allow a user to fix software or driver issues related to communication interfaces. A focus of the debugging may be software performance optimization.

In this simple setup all the debugging may be performed through the IDE interface, and may rely on common software debug tools. A first software debug tool may be a code editor and syntax checker, which can be combined with a compiler that is specific to the target. A second software debug tool can be a software execution control tool, which can download code to the target, start execution of the code, pause execution of the code, stop execution of the code, perform breakpoint control, perform step-by-step execution of each line of code, and which can run the code to breakpoint. A third software debug tool can be a viewer, which can be the output window that presents the output of a printf command, presents software variables, presents memory address content, and presents other custom viewers that help debug the operation of the software in the target system.

A generalized display 100 of an integrated design environment application program is shown in FIG. 1. An engineer often uses such a program for common software debugging functions. When it comes to debugging communications between systems that are not software based, engineers may resort to simple and somewhat primitive common practices like reading values of hardware registers and programming registers. Additionally, the depicted setup in FIG. 1 may not provide any integrated means for performing protocol analysis activities, such as presentation of captured protocol data and control of protocol analysis tools. Instead, if engineers wish to debug and test more complex interfaces, they may have to use additional non-integrated tools. For testing the interaction of the software with industry interfaces, like USB, PCIe, or custom interfaces, engineers can use protocol analyzers, but the operation of such tools may be manual and the engineer may need to regularly switch between tools and views.

The technology described in this application is applicable in a number of situations that are now difficult to debug using existing tool implementations.

EXAMPLE #1

Embedded Software Development

Software may need to interface with USB and PCIe interfaces and an engineer may need to debug how USB commands are translated from the host into PCIe transfers. The engineer may also need to profile the performance of transferring data from the PCIe interface to USB and vice versa. For example, the software may send 32 bytes to a FPGA, but it may result in 1 DWORD data transfers at a time over PCIe.

EXAMPLE #2

Embedded Software Development

In a situation with a system on a chip, an Accelerated Processing Unit (APU) may interface with a controller via a proprietary interface. The engineer may need to debug why certain code causes the controller to hang. The engineer may need to profile interrupts behavior.

EXAMPLE #3

Application/Desktop Software Development

Various layers of software may need to be debugged. Operating system drivers may need to be debugged. The software engineer may need to debug how various product functions are translated into USB commands. The software engineer may need to profile the performance when data is transferred over the USB interface. The software engineer may need to debug how multiple concurrent application threads are serialized over USB. The software engineer may need to debug the bit/byte ordering of data sent over USB.

EXAMPLE #4

An unidentified part of software may be reading large blocks of data from a PCIe-connected peripheral's memory space, but the read throughput may be very poor—far below expectations. The developer may need to capture PCIe bus traces of potential software areas that may be accessing the peripheral's memory. At least one of these traces may capture the poor read throughput case and may show why the throughput is low. The user may then be able to tie that trace and the information therein back to a specific point in the software source code.

EXAMPLE #5

A USB host software routine often hangs while doing a data transfer on a USB bulk out pipe. Half of the time it may work as expected, but the other half of the time it may hang because the system call may never return. The developer may need to capture USB bus traces of the successful case and the error case, and then may compare the two to identify the critical differences.

EXAMPLE #6

Very intermittently, a USB I/O operation may result in an unspecified error. No further information can be obtained about the error from software, so a USB bus trace may be needed to find additional clues about the source of the error. However, since the error happens so infrequently, and since we don't know what events to look for on the USB, it's nearly impossible to catch the error scenario in a bus trace. The developer may need to capture a USB bus trace that contains the period in which the error occurred, and analyze the trace to look for clues about why the error occurred.

Figure 2:
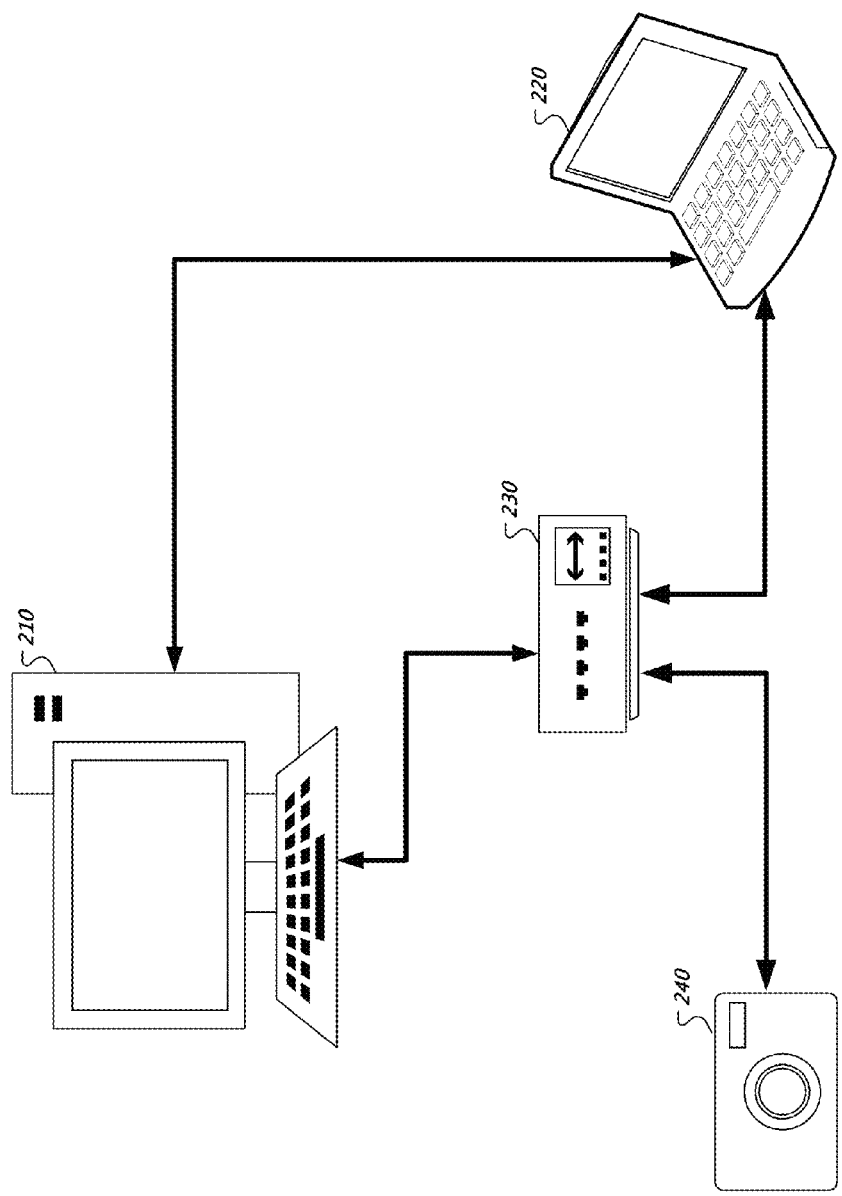
FIG. 2 is an exemplary system setup in accordance with embodiments of this disclosure.

A preferred setup of a system in accordance with an embodiment of the disclosure is shown in FIG. 2. The setup visualized in FIG. 2 demonstrates the use of a protocol analyzer 230 (e.g., the PSG USB Advisor T3) within a debug environment that includes an integrated design environment (e.g., Eclipse IDE) that operates on a computing system 210 and that controls a first computing device 220 (e.g., an ANDROID target system, such a laptop, phone or other computing device).

A purpose of this setup is to test and debug a software developed for the first computing device (e.g., ANDROID software), when the first computing device interacts with a second computing device 240 (e.g., a USB device like a USB Mass Storage system or a camera). In the process of such testing, an engineer may want to debug the transfer of data (a file, for instance) from the first computing device to the second computing device and use the protocol analyzer and its higher-level decodes to check for the correctness of the transfer, and to analyze the information that is transmitted from one device to the other.

To allow for ease of use of protocol tools within the software development and debug workflow, the IDE provided in accordance with an embodiment of the present disclosure provides the engineer with several additional integrated functionalities: 1) The computing system may start, stop, and trigger protocol capture sessions, which may be accessible and displayable within the IDE, either by user actions, by inline commands embedded in the code, or by special "control points" (akin to software break points) attached to the code. 2) The computing system may present a protocol capture view that is time-synchronized to the code under debug, such that the protocol capture view may scroll with the code view when user input changes one of the views or when the code is executing. 3) The computing system may present a protocol capture view that includes markers inserted by the engineer, by the system-under-test or by the protocol analyzer. 4) The computing system may start and stop the software debugger based on commands identified in the data stream analyzed by the protocol analysis tools. 5) The computing system may provide control of exerciser sessions and may generate protocol traffic to test subsystems in the target system under test.

Figure 3:
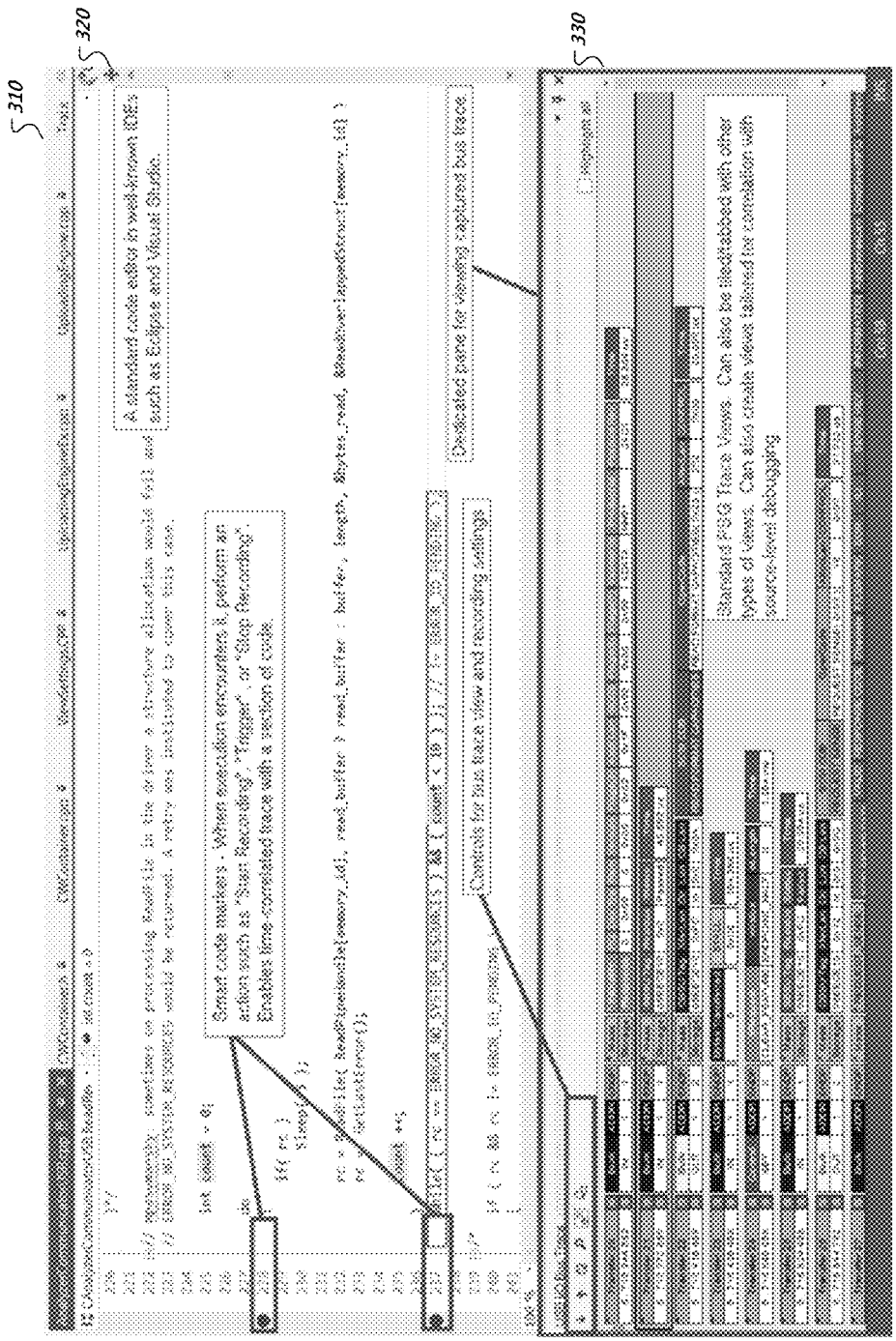
FIG. 3 is an exemplary display in accordance with embodiments of this disclosure.

FIG. 3 depicts one or more features provided in accordance with the present disclosure. A trace view can be shown either as part of a regular trace display software package or as part of a customized plug-in software package developed for the IDE. In this example, the software development program includes a first pane 320 that displays computer code that is to be executed and a second pane 330 that displays trace data that was recorded by the protocol analysis device. The correlation of the views allow for cause-effect analysis between the software debug information and the protocol traffic, such as:

" . . . this function call in software caused that I/O behavior . . . "

" . . . this I/O behavior caused that interrupt handler to be called . . . "

Figure 4:
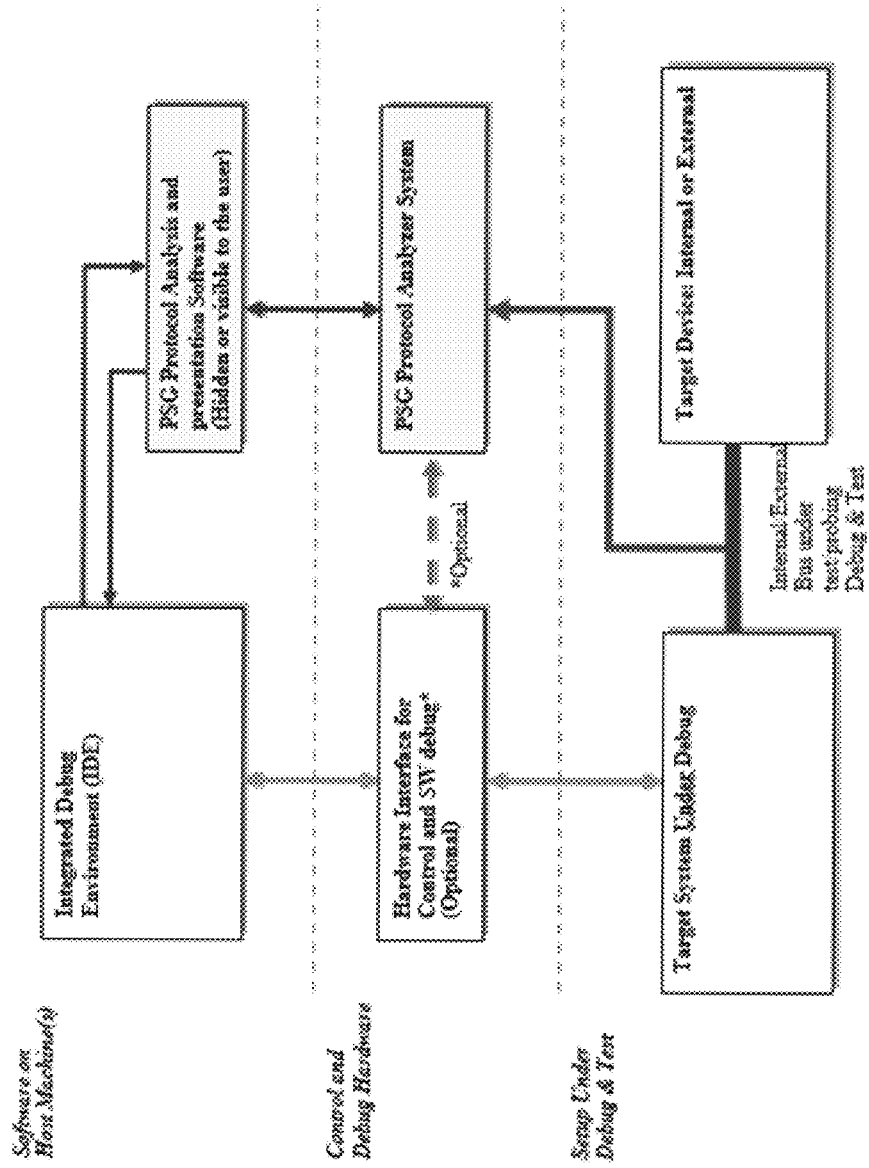
FIG. 4 is a design diagram in accordance with embodiments of this disclosure.

FIG. 4 depicts an architecture setup that can allow for the extended debug functionality using a protocol analyzer. At the Setup under test layer, the protocol analyzer may probe the bus or interface between two or more sub-systems. At the host software layer, the protocol software may interact with the IDE software. The control/debug hardware layer is optional and may allow for either the software debug hardware or the protocol analyzer to cross trigger and cross control the operation of the system.

In the case of embedded instrumentation setup, the analyzer system may be partitioned into two or more pieces, some located inside the target device and others implemented as external equipment. The extended setup concept, however, may remain the same.

Figure 5:
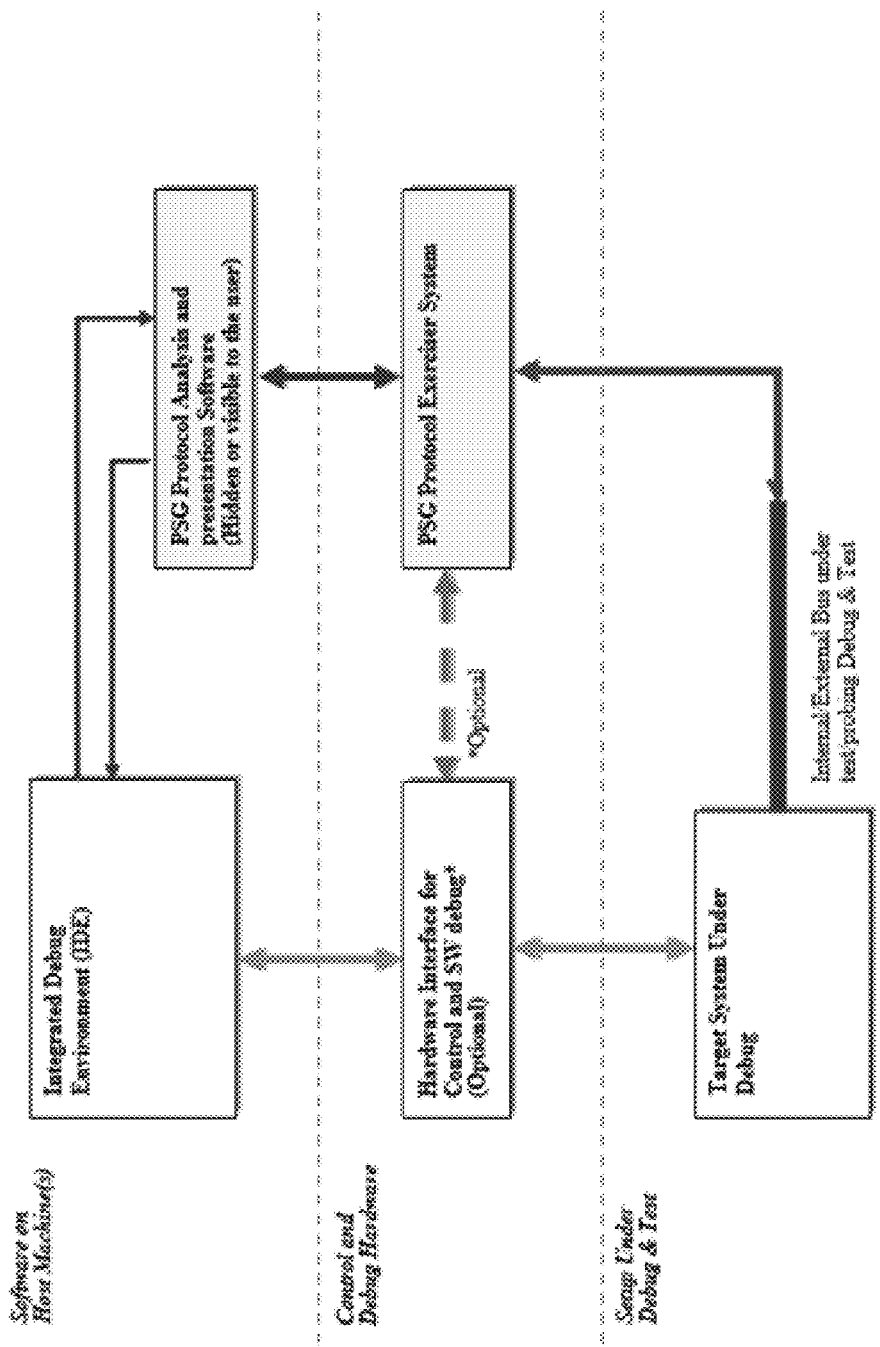
FIG. 5 is a design diagram in accordance with embodiments of this disclosure.

FIG. 5 depicts an architecture setup which may allow for the extended debug functionality using a protocol exerciser.

At the Setup-Under-Test layer, the protocol exerciser communicates with the target sub-system and generates protocol traffic to test the behavior of the sub-system (e.g., by passing data from a first hardware device to a second hardware device over a communication channel, where the first hardware device and the second hardware device are different from the computing system at which the IDE software and any protocol analysis software are executing). At the host software layer, the protocol software interacts with the IDE software. The control/debug hardware layer is optional and may allow for either the software debug hardware or the protocol exerciser cross functionality.

In some embodiments, the system will be provided as a plugin/extension to an Integrated Development Environment (IDE) for software developers. The technology may additionally or alternatively integrate with the APIs and other framework elements of the IDE to allow for advanced plugin development.

The following use cases are anticipated to be enabled in accordance with the various embodiments when using a protocol analyzer:

Case 1: A user sets a breakpoint in code and steps through the code a single step at a time.

A user sets a breakpoint at the start of a section of interest.

The user configures the protocol analyzer recording settings (via the user interface of the above-describe plugin, through a separate application for the protocol analyzer, or through interaction with the user interface of the IDE itself). If applicable, the user selects the protocol analyzer's spooling/real-time mode to see recorded bus traffic in real-time.

The user runs the code.

The debugger pauses when execution hits the breakpoint.

The user pushes a button (e.g., in the IDE or in a plugin toolbar of the IDE) to "Start Analyzer Recording and Step." The analyzer may then begin recording, and if applicable, spools traffic to a window in the IDE immediately. Alternatively, the user may automate this action by customizing the breakpoint behavior (e.g., using the plugin).

The user may single step through code execution. In doing so, the user may review memory, registers, protocol traffic, etc. If applicable, the protocol traffic may be decoded according to a user's custom needs, such as by performing memory address mapping or register decoding.

Case 2: A user sets his or her own breakpoint and runs through a section of code without breaks.

A user sets a breakpoint at a start of a section of interest.

The user sets a breakpoint at an end of a section of interest.

The user configures the analyzer recording settings (e.g., via Plugin GUI, the IDE user interface, or a connected Protocol App).

The user runs the code.

When execution of the code hits the first breakpoint, the debugger pauses.

The user interacts with the IDE to start analyzing recording (e.g., by pressing a plugin toolbar button to "Start Analyzer Recording and Continue"). The analyzer begins recording, and code execution may continue. Alternatively, the user may automate this action by using the plugin to customize the breakpoint behavior.

When execution hits the second breakpoint, the debugger pauses.

The user interacts with the IDE to stop recording and upload a trace (e.g., by pushing a plugin toolbar button to "Stop Recording and Upload Trace"). In response the analyzer may stop recording and upload a trace. Alternatively, the user may automate this action by using the Plugin to customize the breakpoint behavior.

The user may review the protocol trace. If applicable, protocol traffic may be decoded according to user's custom needs. The system may perform memory address mapping and register decoding.

The user may correlate trace data with the section of code between the breakpoints.

Case 3: A user configures the analyzer trigger to pause the debugger.

A user may configure the protocol analyzer to trigger on a protocol event of interest and emit a trigger signal through an external analyzer output.

Within the "Control and Debug Hardware" layer depicted in FIG. 4, the user may connect the external analyzer output to an external input of the "Hardware Interface for Control and software Debug".

The user may configure the "Hardware Interface for Control and software Debug" to pause the software debugger upon receiving a signal on the external input.

The user may start recording on the analyzer, and may then run the software-under-test in the debugger.

When the analyzer triggers, it can send a signal to the "Hardware Interface for Control and software Debug", thereby causing the debugger to pause code execution, enabling the developer to tightly correlate the protocol event of interest with a section of executed software code.

Case 4: The captured protocol trace is annotated with markers to help correlate certain protocol events with certain other software code execution events.

A user sets "control points" in the source code within the software IDE and configures them to insert markers into the protocol bus recording on the protocol analyzer.

The user starts recording on the analyzer, then runs the software-under-test in the debugger.

For each of the "control points" that the software debugger encounters, the debugger will send a command to the protocol analyzer to insert a marker into the recording.

When recording is done, the completed trace file that was recorded by the analyzer will contain any markers that were set by the software debugger.

It is anticipated that any software package provided in accordance with one or more embodiments of the technology described herein will be available to run in their standard full configurations, and can interact with the IDE software through pre-defined API, on the same host machine. Another option is to run the functionality as a plug-in that is designed to work as one of the view windows in the IDE (or the technology can be integrated directly into an IDE).

Analysis Tool Control—General Analyzer or Exerciser Settings. The systems, method, and software (protocol analysis) described herein can preferably be controlled from the IDE software, allowing for preparation of a capture or exercising session, and for the start and stop of a session. The interface for this control may be at the software level. The analysis software may provide all the necessary settings to allow the analyzer to capture correctly the bus traffic.

Other Analysis Tools—The systems, method, and software described herein allows for the control of other integrated analysis tools, and specifically tools that generate or pass protocol traffic as stimulus, like jammers, emulators, and trainers. The systems, methods, and software can be controlled from the IDE software, allowing for preparation, start, and stop of a session. The systems, methods, and software also provides all of the necessary settings to allow the tool to perform the functionality.

Run-control—Analysis Software Run-control from IDE. 1) Code Instrumentation: The system supports various code instrumentation primitives to help with the control and readability of the analysis results. 2) Session Control: Primitives are preferably supported for arming, starting, pausing, resuming and stopping protocol capture sessions. Smart Control Points will allow the control of a capture session, without requiring the user to manually control the analyzer. The Smart Control Points control the following session steps: a) Preparation; b) Arming/Triggering; and c) Start and Stop of capture. The control points can be reused multiple times in an execution of a code.

Markers—Primitives are supported by the IDE, to allow the injection of markers into the trace. For accuracy, the markers can be injected at the hardware layer, by allowing the system under test to signal the analyzer, through an external input connector like 'Trigger In', to add a "marker" event with an internal timestamp in the capture buffer. When uploaded to the software, the captured data displayed also shows the markers. As an example, if the user adds a primitive in the software that would add a marker for every iteration that causes the system to send data on an internal PCIe bus that the analyzer probes, the resulting trace would include markers that show the pass through each of the iterations. A trace may also be manually tagged by the clicking of a button by a user, for example, while the code is running.

Triggers—Protocol Event Triggers are preferably set to pause or breakpoint the execution of a code. There are at least two methods to support this requirement: 1) software-based—In this method the IDE signals the Analysis tool to start, stop, or pause the execution, through its APIs. 2) Hardware-based—In this method the setup requires connecting an output hardware connector of the device under test, like TRIGGER OUT, to an input connector of the analysis tool, like TRIGGER INPUT. To use this method, the software engineer would instrument the software under test to generate a proper signal at a specific location of the software code. When the software execution reaches that location in the software, a signal would show at the designated output connector, reach the analysis tool and cause it to execute a pre-defined function like starting a recording.

Analysis of protocol—Trace Creation: When a stop-capture event occurs, the analyzer system may create a snapshot of protocol traffic and open a trace file and view it in a trace view. Each 'Execute' action in the software may reset the trace view and show a new trace. Users may be able to select whether previous traces should be stored or deleted. Reports and Views: All protocol analysis views and reports available in the regular analysis software, may also be available for IDE setups. Time Correlation: The analyzer software supports time correlation of information between the trace view and the IDE, allowing navigation through a trace and a code. Custom interfaces: A major advantage of a protocol and bus development tool is the support of custom decoding that can be created by the user to accelerate the comprehension of bus events and traffic correctness. The systems, methods, and software described herein preferably provides user-defined decoding functionality to allow engineers to create their own "protocol". System status and data decoding: In addition to custom decodes for bus traffic, the protocol analysis software should support decoding of other system data in conjunction to protocol traffic: 1) interrupt vectors; 2) address maps; and 3) file system structures and the like.

Figure 6A:
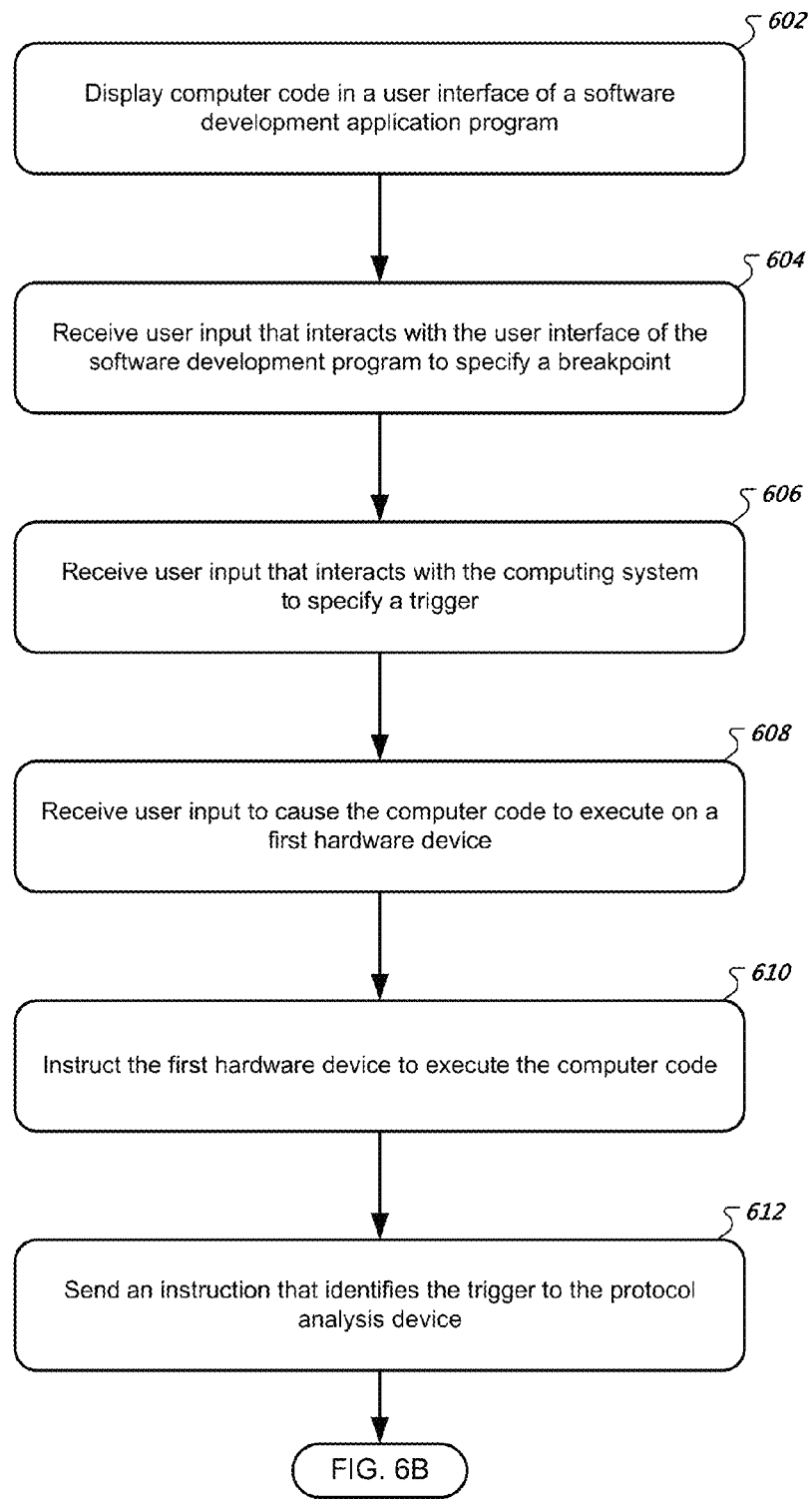
FIGS. 6A-C show a flowchart in accordance with various embodiments of this disclosure.
Figure 6B:
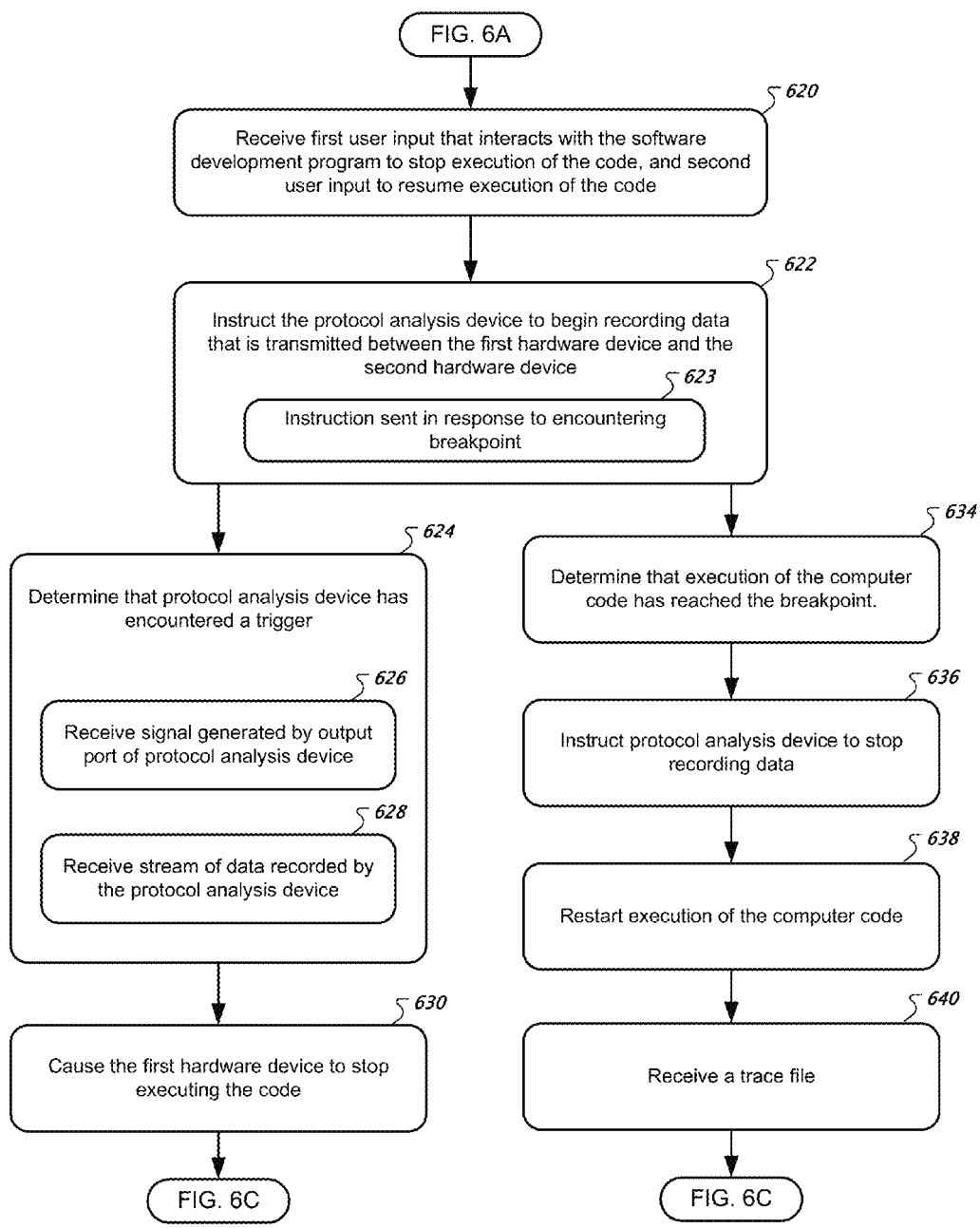
Figure 6C:
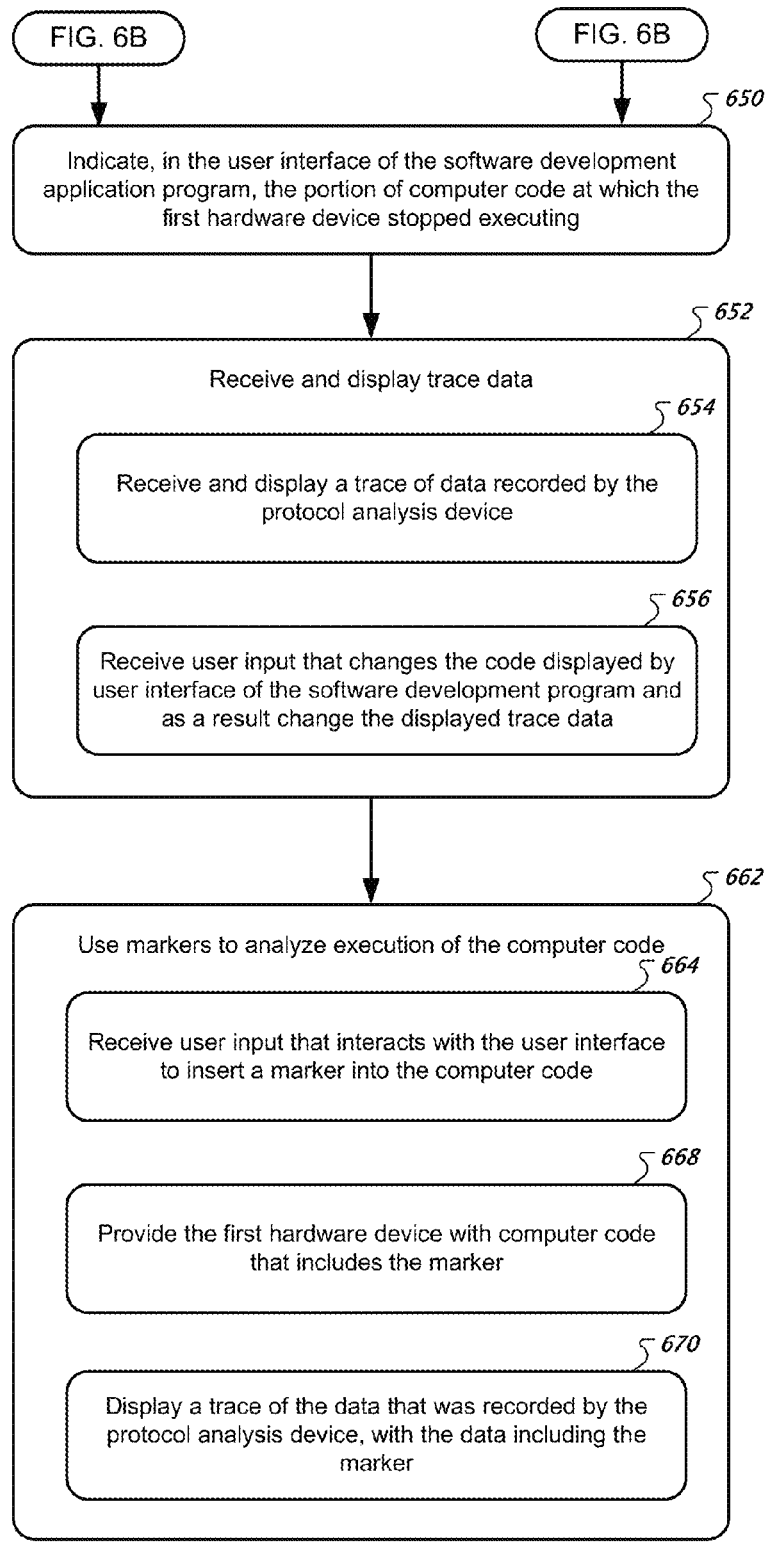

FIGS. 6A-6C show a flowchart that illustrates various aspects of the technology described in this disclosure.

At box 602, the computing system displays at least a portion of computer code in a user interface of a software development application program. For example, the computing system 210 (FIG. 2) may present a user interface of a software development application program, which may be an integrated design environment (IDE) or one of the programs in an IDE. The user interface of the software development program may present code that a user types into a window of the user interface, and may include user interface elements with which the user is able to start and stop execution of the code (whether that execution is a simulation of the code of an actual execution of the code by the same or another device). In this document, code is considered stopped if code execution has been paused and can resume.

The computing system can also receive user input that types the computer code or a portion thereof into the software development program. For example, a user may select a location within a display of the code with a mouse cursor or by touching a portion of the code on a touchscreen. The user may then use a keyboard to type code elements (e.g., functions and variables) into the code. As the user types the code, the software development program may recognize that certain items are functions and that certain items are variables, and may auto-complete portions of the code, may color-change portions of the code, and may structure portions of the code, for example, with indenting.

At box 604, the computing system receives user input that interacts with the user interface of the software development program to specify a breakpoint in the displayed computer code. For example, the user can select a user interface element to cause the software development program to insert a breakpoint at a location in the displayed computer code, such as at a line of code. (The location may have been previously selected by user input using a mouse cursor.) In some examples, the user inserts a control point at which the computing system would perform a particular action that is specified for the control point (but at which the computing system may not necessarily stop execution of the computer code). Operations discussed herein with reference to breakpoints can also be used for non-breaking control points.

At box 606, the computing system receives user input that interacts with the user interface of the computing system to specify a trigger. The trigger may be a data element on which a protocol analysis device that is in communication with the computing system (e.g., wirelessly or over a wired communication link) is triggered to perform some pre-defined action, such as stop analysis, output a signal on a specified external port, or upload a trace of recorded data values over another communication channel. The user input can specify the trigger through the user interface of the software development program, or through a user interface of another application program that is in communication with the protocol analysis device (e.g., an application program for the protocol analysis device).

At box 608, the computing system receives user input to cause the computer code to execute on a first hardware device. As an example, the computer code may be designed for execution on a device that is separate from the computing system. For instance, the computing system may be a laptop or desktop computer, and the first hardware device may be a different laptop or desktop computer, a tablet device, a smartphone, or any of various other devices, such as an intelligent refrigerator and a smart toaster. The user may request that the computing system cause the computer code to execute on one of these such devices by interacting with the user interface of the software development application program, for example, by using a touchscreen or mouse cursor to press a button (e.g., a "play" button).

At box 610, the computing system instructs the first hardware device to execute the computer code, which the computing system may perform in response to the computing system having received the above-described user input. In some examples, the computer code may have already been compiled and transferred to the first hardware device, and the instruction can include sending an instruction to the first hardware device to execute the already-complied and transferred code. In some examples, instructing the first hardware device to execute the computer code can include the computing system compiling the code, sending the code to the first hardware device, and thereafter causing the first hardware device to execute the code. Execution of the code by the first hardware device can include the first hardware device transmitting data over a communication link to one or more other hardware devices, such as a second hardware device.

At box 612, the computing system sends, for receipt by the protocol analysis device as a result of having received the user input that specifies the trigger (see box 606), an instruction that identifies the trigger. For example, after specifying the trigger (box 606), the computing system may send the trigger or information from which the trigger can be calculated, to the first hardware device. The transmission may occur automatically (e.g., without user input) upon the user specifying the trigger, or may occur in response to the user selecting another user interface element, such as a button to transmit the trigger to the protocol analysis device.

At box 620, the computing system receives first user input that interacts with the software development program to request stopping of execution of the computer code. For example, during some executions of the computer code, the user may press a "stop" or "pause" button in the user interface of the software development program to request stopping execution of the computer code. In response, the software development program may stop executing the computer code and may show a most-recently-executed line of computer code (which may not be a beginning line or ending line of the computer code). Also in response, the computing system may send an instruction to the first hardware device to stop its execution of the computer code. As described below, the code may also stop executing upon reaching a breakpoint.

In some examples, the software development program (and thus computing system) may control the execution of the code by the first hardware device through communication with a debugging agent application program that executes on the first hardware device. For example, the software development program may send a compiled version of the computer code to the first hardware device. This code may operate under the control of (or under monitoring by) the debugging agent application program, which may determine when a breakpoint in the computer code has been reached, may take actions or otherwise cause the compiled code to stop executing, and may send a notification to the software development program that the computer code has stopped executing at the breakpoint.

Also at box 620, the computing system receives second user input that interacts with the software development program to request restarting execution of the computer code. For example, a user may select a "play" or "restart" user interface element in the user interface that is presented by the software development program. In response, the software development program may start execution of computer code from the location at which it stopped executing code. It may do so by sending an instruction to the first hardware device to start (e.g., restart) execution of code.

At box 622, the computing system instructs the protocol analysis device to begin recording data that is transmitted between the first hardware device and a second hardware device. The protocol analysis device may be configured to intercept data that is transmitted between the first hardware device and the second hardware device. A cable may run from an output port of the first hardware device to an input port of the protocol analysis device, and another cable may run from an output port of the protocol analysis device to an input port of the second hardware device. The instruction may cause the protocol analysis device to receive a data item from the first hardware device, analyze that data item to determine if it satisfies certain conditions, possibly store the data, and to pass the data item to the second hardware device, unchanged in many instances.

At box 623, the computing system sends the instruction in response to the computing system being notified that the first hardware device has encountered a line of code on which a breakpoint was set. As an illustration, a user may insert a breakpoint into computer code at a location at which the user would like the protocol analysis device to begin recording data that is transmitted from the first hardware device to the second hardware device. During runtime, the first hardware device may be executing code and may reach the breakpoint, at which time the first hardware device (e.g., a debugging agent application program thereon) may halt execution of the code and may send a signal to computing system, to notify the software development program that code execution has reached the breakpoint. At this point, the software development program may send a signal to the protocol analysis device to cause the protocol analysis device to begin recording data. After the software development program sends the signal to the protocol analysis device, the software development program may optionally, per a setting in the configuration for the breakpoint, send a command to the first hardware device to cause it to resume code execution. As such, upon execution of the code reaching a breakpoint, the execution of the code may temporarily stop in order to allow the protocol analysis device to begin recording data. These operations may occur automatically and without user input during the stopping and resumption of code execution.

In other examples, the computing system sends the instruction to begin recording data in response to user input interacting with a user interface of the computing system. For example, a user may click a "start recording" button in a user interface of the software development program or a user interface of another application program that is configured to communicate with the protocol analysis device.

At box 624, the computing system determines that the protocol analysis device, which is recording data that is transmitted between the first hardware device and the second hardware device during execution of the computer code by the first hardware device, has encountered a trigger (e.g., due to the computing system receiving a notification that the protocol analysis device has encountered a trigger event).

At box 626, the protocol analysis device encounters the trigger due to the protocol analysis device receiving a signal on its external trigger input from either the first or second hardware device. The signal may specifically identify that a trigger was encountered and may be an only signal input on a particular input port of the protocol analysis device (e.g., the input port may not be used to receive other information). As an illustration, a user may have inserted instrumentation code into the code that is executed by the first hardware device. The instrumentation code may cause the first hardware device to output a signal on a particular output port at when the instrumentation code portion of the computer code is executed. The output port of the first hardware device may connect to the input port of the protocol analysis device, causing the protocol analysis device to trigger at certain locations in the execution of the computer code.

At box 628, the protocol analysis device encounters due to a determination by the protocol analysis device that the data transmitted between the first and second hardware devices includes an event that matches the programmed trigger event.

In response to the protocol analysis device encountering the trigger (e.g., either due to it receiving a signal on the trigger input port or due to it determining that the data includes an event that matches the programmed trigger event), the protocol analysis device may send a notification for receipt by the software development program.

At box 630, the computing system causes the first hardware device to stop executing the computer code. This action may be responsive to the computing system having determined that the protocol analysis device encountered the trigger. The causing may involve the computing system sending an instruction that, when received by the first hardware device, causes the first hardware device to stop executing the computer code. Also responsive to the computing system having determined that the protocol analysis device encountered the trigger, the software development program may indicate in its user interface the line of code at which execution stopped.

In some embodiments, instead of the protocol analysis device directly notifying the computing system that it encountered a trigger (and the computer system then instructing the first hardware device to stop executing the code), the protocol analysis device sends a notification to the first hardware device, which upon receiving the notification, may stop execution of the computer code and send a notification to the computing system. In response to the computing system receiving the notification, the software development program may indicate in its user interface the line of code at which execution stopped.

At box 634, the computing system determines that execution of the computer code has reached the breakpoint. For example, the computing system may receive a notification from a debugging agent on the first hardware device indicating that the first hardware device has encountered a breakpoint and has stopped executing the code at that breakpoint. In response to receiving this notification, the computing system may indicate the line of computer code at which execution stopped and may enable a user interface element for restarting the execution of the computer code.

At box 636, as a result of the computing system having determined that execution of the computer code has reached the breakpoint, the computing system instructs the protocol analysis device to stop recording the data that is transmitted between the first hardware device and the second hardware device. For example, the computing system may transmit an instruction for receipt by the protocol analysis device that, when received by the protocol analysis device, causes that device to stop recording data. The receipt of the instruction or another instruction in response to the determination may cause the protocol analysis device to stop forwarding any data to the second hardware device. The receipt of the instruction or the other instruction may cause the protocol analysis device to send a trace file with the recorded information (or pertinent portions thereof) to the computing system. In other words, the protocol analysis device may not stream the data values that it records to the computing system, and may send all this information automatically and without a user request once it has finished recording. These operations for transmitting the instruction to stop the recording of the data may also be performed in response to the software development program receiving user input to stop the execution of the computer code.

In various examples, software development program may allow a user to specify various operations to perform upon reaching a breakpoint, such as stopping execution of code, starting execution of code, and instructing the protocol analyzer to insert a marker into its recording of data that is transmitted from the first hardware device to the second hardware device. The user may further be able to specify whether, after performing any of the specified operations, the software development program is to instruct the first hardware device to begin execution, all without receipt of user input.

At box 638, the computing system performs one of the above-described actions, by restarting execution of the computer code after it instructed the protocol analysis device to stop recording data. As such, the computing system may stop execution upon reaching a breakpoint, instruct the protocol analysis device to stop recording, and then resume execution of the computer code, all without user input during the stopping and restarting of the execution of the computer code.

At box 640, the computing system may receive an indication that a trace is available for the data that the protocol analysis device recorded during the execution of the computer code by the first hardware device (e.g., by receiving a trace file). As described above, in response to the computing system having determined that execution of the computer code has reached the breakpoint, the computing system may send a command to the protocol analysis device. That command may cause the protocol analysis device to send a trace file with the recorded information (or the relevant portions thereof).

At box 650, the computing system may indicate, in the user interface of the software development application program, the portion of the computer code at which the first hardware device stopped executing. For example, a window of the software development program may include an arrow or other distinguishing graphical element to indicate which line of code was last executed by the first hardware device (e.g., in some examples, this identifying the next line of code to execute). To elaborate, the user interface of the software development program may include a window that includes the computer code that is executing. The computer code may be substantial and may occupy more than a displayable region of the window. As such, the window may be scrollable or otherwise navigable by the user to present different portions of the code within the window.

At box 652, the computing system displays trace data and updates its display to correspond to that of the executed computer code.

At box 654, the computing system receives, from the protocol analysis device, a trace of the data that was transmitted between the first hardware device and the second hardware device and that was recorded by the protocol analysis device. For example, the computing system may receive a continuous stream of data from the protocol analysis device as it analyzes the communication channel. The trace may also be sent as a bulk transfer of data at one time after the protocol analysis device stopped recording data. The computing system may then display the trace of the data in the user interface of the software development program.

At box 656, the computing system receives user input that changes the user interface of the software development program from displaying a first portion of the computer code to presenting a second portion of the computer code. As a result, the computing system may change the user interface from displaying a first portion of the trace to displaying a second portion of the trace. For example, a user may decide to scroll up and down in the window that displays the computer code to analyze different lines of code. As the user does that, the window for the trace data may scroll up and down to display a corresponding portion of the trace data. Moreover, should the user select a line of code in the computer code window, the computing system may automatically indicate one or more corresponding data elements in the trace window (e.g., by highlighting a line of the trace code or by identifying it with an arrow). A trace data element may correspond to a line of code if that data element was recorded by the protocol analysis device shortly after the computing system instructed the first hardware device to execute the line of code. The computing system may match these items by comparing a timestamp that may accompany each data element in the trace and that indicates times at which the data elements were recorded, with timestamps for the lines of code and that indicate the times at which the lines of code were executed.

At box 662, the user of the computing system uses markers to analyze the execution of the computer code. In some examples, certain of these operations may occur before execution of the computer code, for example, before the operations of boxes 608 and 610.

At box 664, the computing system receives user input that interacts with the user interface of the software development program to insert a marker into the computer code. For example, the user interface may include a button that allows a user to insert a special instruction into a user-specified location in the code (e.g., like with insertion of breakpoints). The user interface may enable a user to specify not only that a marker should be inserted, but a value for the marker.

At box 668, the computing system provides, for receipt by the first hardware device, the computer code with the marker included therein. For example, the computing system may download to the first hardware device a compiled version of the computer code, or may send to the first hardware device instructions to execute one at a time during the execution of the computer code by the first hardware device. One of the instructions may be the marker, which may cause the first hardware device to transmit a specific value (e.g., a user-specified value, as described above) over the communication channel that is being monitored by the protocol analysis device.

At box 670, the computing system displays, in the user interface of the software development program, a trace of the data that was transmitted between the first hardware device and the second hardware device and that was recorded by the protocol analysis device, with the displayed data including the marker. For example, the protocol analysis device may have identified the marker (along with various other data elements) in the stream of data transmitted over the communication channel, and may provide an indication that the marker was identified to the software development program. In some examples, this may be a transmission of a trace of the recorded data, which may include therein the marker. The software development program may graphically emphasize or treat the markers differently than other data elements (e.g., with a button that allows a user to jump from one marker in code to the next).

Figure 7:
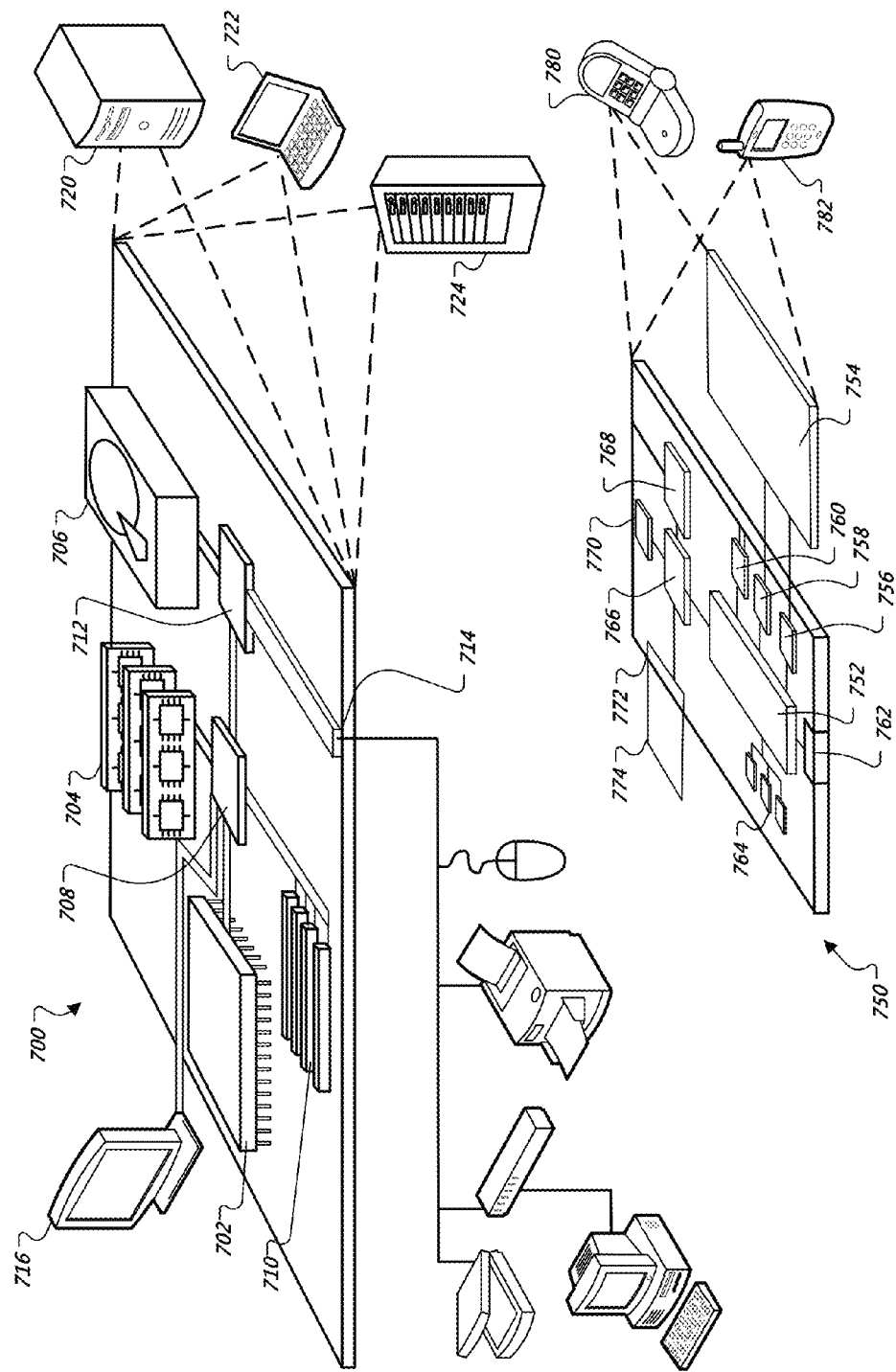
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is by way of example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, some of which are shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a graphical display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for controlling a protocol analysis device when a code execution breakpoint is encountered, the method comprising:

displaying, by a computing system, at least a portion of computer code in a user interface of a software development program, wherein the computer code includes a user-specified breakpoint at which execution of the computer code is to stop when the computer code is executed;

receiving, by the computing system, user input to cause a first hardware device to execute the computer code that is presented by the user interface of the software development program;

instructing, by the computing system, the first hardware device to execute the computer code that is presented by the user interface of the software development program, wherein execution of the computer code by the first hardware device causes the first hardware device to transmit data over a communication channel to a second hardware device;

instructing, by the computing system, a protocol analysis device that is in communication with the computing system to begin recording data that is transmitted between the first hardware device and the second hardware device over the communication channel during execution of the computer code by the first hardware device, wherein the protocol analysis device is a hardware device that is different from the first hardware device and is different from the second hardware device, and wherein the protocol analysis device is connected within the communication channel between a communication port of the first hardware device and a communication port of the second hardware device; and determining, by the computing system, that execution of the computer code has reached the breakpoint and as a result instructing, by the computing system, the protocol analysis device to start or stop recording the data that is transmitted between the first hardware device and the second hardware device without the computing system having received user input after determining that execution of the computer code has reached the breakpoint.

2. The computer-implemented method of claim 1, further comprising:

determining, by the computing system, that execution of the computer code has reached another breakpoint;

wherein the computing system instructing the protocol analysis device to begin recording data that is transmitted between the first hardware device and the second hardware device is performed by the computing system without receipt of user input after determining that the execution of the computer code has reached the another breakpoint.

3. The computer-implemented method of claim 1, wherein the computing system instructs the protocol analysis device to stop recording the data as a result of the computing system having determined that execution of the computer code has reached the breakpoint.

4. The computer-implemented method of claim 1, further comprising:

causing, by the computing system and as a result of having determined that the execution of the computer code has reached the breakpoint, the first hardware device to stop executing the computer code.

5. The computer-implemented method of claim 1, further comprising:

receiving, by the computing system and as a result of having determined that the execution of the computer code has reached the breakpoint, a trace file that identifies the data that the protocol analysis device recorded during the execution of the computer code by the first hardware device.

6. The computer-implemented method of claim 1, further comprising:
determining, by the computing system, that execution of the computer code has reached another breakpoint and as a result instructing, by the computing system, the protocol analysis device to insert a marker into a recording of the data that is transmitted between the first hardware device and the second hardware device; and
displaying, by the computing system and within a user interface of the software development program, at least a portion of the recording of the data that is transmitted between the first hardware device and the second hardware device, with the displayed at least portion including the marker that was inserted into the recording of the data that was transmitted between the first hardware device and the second hardware device.

7. The computer-implemented method of claim 1, further comprising:
receiving, by the computing system, user input that interacts with the user interface of the software development program to insert a marker into the computer code;
providing, by the computing system and for receipt by the first hardware device, the computer code with the marker included therein; and
displaying, by the computing system and in the user interface of the software development program, a trace of the data that was transmitted between the first hardware device and the second hardware device and that was recorded by the protocol analysis device, with the displayed data including the marker.

8. The computer-implemented method of claim 1, further comprising:
receiving, by the computing system and from the protocol analysis device, a trace of the data that was transmitted between the first hardware device and the second hardware device and that was recorded by the protocol analysis device;
displaying, by the computing system and in the user interface of the software development program, the trace of the data that was transmitted between the first hardware device and the second hardware device and that was recorded by the protocol analysis device; and
receiving, by the computing system and in the user interface of the software development program, user input that changes the user interface of the software development program from displaying a first portion of the computer code to presenting a second portion of the computer code, and as a result changing, by the computing system, the user interface from displaying a first portion of the trace to displaying a second portion of the trace,
wherein the first portion of the trace includes data that was transmitted between the first hardware device and the second hardware device as a result of execution by the first computing device of the first portion of code,
wherein the second portion of the trace includes data that was transmitted between the first hardware device and the second hardware device as a result of execution by the first computing device of the second portion of code.

9. The computer-implemented method of claim 1, further comprising:
regularly updating, by the computing system and while the computer code is executing on the first hardware device, the user interface of the software development program to indicate the portion of the computer code that the first hardware device is executing at that time, by regularly changing the portion of the computer code that is presented by the user interface of the software development program.

10. The computer-implemented method of claim 1, wherein the execution of the computer code by the first hardware device is controlled by the software development program such that user input interacting with the software development program is able to start execution of the computer code by the first hardware device and stop execution of the computer code by the first hardware device.

11. A system comprising,
one or more processors;
one or more computer-readable devices including instructions that, when executed by the one or more processors, cause performance of operations that comprise:
displaying, by a computing system, at least a portion of computer code in a user interface of a software development program, wherein the computer code includes a user-specified breakpoint at which execution of the computer code is to stop when the computer code is executed;
receiving, by the computing system, user input to cause a first hardware device to execute the computer code that is presented by the user interface of the software development program;
instructing, by the computing system, the first hardware device to execute the computer code that is presented by the user interface of the software development program, wherein execution of the computer code by the first hardware device causes the first hardware device to transmit data over a communication channel to a second hardware device;
instructing, by the computing system, a protocol analysis device that is in communication with the computing system to begin recording data that is transmitted between the first hardware device and the second hardware device over the communication channel during execution of the computer code by the first hardware device,
wherein the protocol analysis device is a hardware device that is different from the first hardware device and is different from the second hardware device, and
wherein the protocol analysis device is connected within the communication channel between a communication port of the first hardware device and a communication port of the second hardware device; and
determining, by the computing system, that execution of the computer code has reached the breakpoint and as a result instructing, by the computing system, the protocol analysis device to start or stop recording the data that is transmitted between the first hardware device and the second hardware device without the computing system having received user input after determining that execution of the computer code has reached the breakpoint.

12. A computer-implemented method for stopping execution of computer code when a protocol analysis device triggers, the method comprising:

displaying, by a computing system, at least a portion of computer code in a user interface of a software development application program;

receiving, by the computing system, user input to cause a first hardware device to execute the computer code that is presented by the user interface of the software development application;

instructing, by the computing system, the first hardware device to execute the computer code, wherein execution of the computer code by the first hardware device causes the first hardware device to transmit data over a communication channel to a second hardware device;

determining, by the computing system, that a protocol analysis device, which is recording data that is transmitted between the first hardware device and the second hardware device during execution of the computer code by the first hardware device, has encountered a trigger, wherein execution of the computer code at the first hardware device is stopped after protocol analysis device has encountered the trigger, wherein the protocol analysis device is a hardware device that is different from the first hardware device and is different from the second hardware device, and wherein the protocol analysis device is connected within the communication channel between a communication port of the first hardware device and a communication port of the second hardware device; and indicating, by the computing system and in the user interface of the software development application program, a portion of the computer code at which the first hardware device stopped executing in response to the protocol analysis device encountering the trigger.

13. The computer-implemented method of claim 12, further comprising:

sending, by the computing system as a result of the computing system having determined that the protocol analysis device has encountered the trigger, a signal to the first hardware device to cause the first hardware device to stop executing the computer code.

14. The computer-implemented method of claim 12, wherein the protocol analysis device encountering the trigger includes the protocol analysis device encountering the trigger in the data that is transmitted between the first hardware device and the second hardware device, wherein the trigger includes a data element of a particular value or a collection of data elements of a particular sequence of values.

15. The computer-implemented method of claim 14, further comprising:

receiving, by the computing system, user input that interacts with a user interface of the computing system to specify the trigger.

16. The computer-implemented method of claim 15, further comprising:

sending, by the computing system for receipt by the protocol analysis device as a result of the computing system having received the user input that specifies the trigger, an instruction that identifies the trigger and that indicates that the protocol analysis device is to perform a predefined action upon encountering the trigger in the data that is transmitted between the first hardware device and the second hardware device.

17. The computer-implemented method of claim 12, wherein the protocol analysis device encountering the trigger includes the protocol analysis device receiving, at a trigger input of the protocol analyzer, a signal that was sent by the first hardware device.

18. The computer-implemented method of claim 12, wherein the computing system determining that the protocol analysis device has encountered the trigger includes the computing system receiving a notification that was generated by the protocol analysis device and that indicates that the protocol analysis device has encountered the trigger.

19. The computer-implemented method of claim 12, wherein the computing system determines that the protocol analysis device has encountered the trigger in the data as a result of the protocol analysis device notifying the first hardware device that the protocol analysis device has encountered the trigger, and the first hardware device sending a responsive notification to the computing system.

20. The computer-implemented method of claim 12, wherein the execution of the computer code by the first hardware device is controlled by the software development application program, such that user input interacting with the software development application program is able to start execution of the computer code by the first hardware device and stop execution of the computer code by the first hardware device.

21. The computer-implemented method of claim 12, further comprising:

receiving, by the computing system and from the protocol analysis device, a trace of the data that was transmitted between the first hardware device and the second hardware device and that was recorded by the protocol analysis device;

displaying, by the computing system and in the user interface of the software development program, the trace of the data that was transmitted between the first hardware device and the second hardware device and that was recorded by the protocol analysis device; and receiving, by the computing system and in the user interface of the software development program, user input that changes the user interface of the software development program from displaying a first portion of the computer code to presenting a second portion of the computer code, and as a result changing, by the computing system, the user interface from displaying a first portion of the trace to displaying a second portion of the trace, wherein the first portion of the trace includes data that was transmitted between the first hardware device and the second hardware device as a result of execution by the first computing device of the first portion of code, wherein the second portion of the trace includes data that was transmitted between the first hardware device and the second hardware device as a result of execution by the first computing device of the second portion of code.

22. A system comprising, one or more processors; and
one or more computer-readable devices including instructions that, when executed by the one or more processors, cause performance of operations that comprise:

displaying, by a computing system, at least a portion of computer code in a user interface of a software development application program;

receiving, by the computing system, user input to cause a first hardware device to execute the computer code that is presented by the user interface of the software development application;

instructing, by the computing system, the first hardware device to execute the computer code, wherein execution of the computer code by the first hardware device causes the first hardware device to transmit data over a communication channel to a second hardware device;

determining, by the computing system, that a protocol analysis device, which is recording data that is transmitted between the first hardware device and the second hardware device during execution of the computer code by the first hardware device, has encountered a trigger, wherein execution of the computer code at the first hardware device is stopped after protocol analysis device has encountered the trigger, wherein the protocol analysis device is a hardware device that is different from the first hardware device and is different from the second hardware device, and wherein the protocol analysis device is connected within the communication channel between a communication port of the first hardware device and a communication port of the second hardware device; and indicating, by the computing system and in the user interface of the software development application program, a portion of the computer code at which the first hardware device stopped executing in response to the protocol analysis device encountering the trigger.

* * * * *